A. G. SEAMAN, S. OSBORNE, H. A. COX & A. W. GATTIE.
MEANS FOR DISTRIBUTING PARCELS AND THE LIKE.
APPLICATION FILED DEC. 7, 1911.

1,223,624.

Patented Apr. 24, 1917.
5 SHEETS—SHEET 1.

Witnesses:
A. B. Mattingly
H. D. Penney

Inventors:
Arthur G. Seaman,
Samuel Osborne,
Henry A. Cox,
Alfred W. Gattie,
By their Attorney, F. H. Richards.

UNITED STATES PATENT OFFICE.

ARTHUR GEORGE SEAMAN, OF BOWDEN, SAMUEL OSBORNE, OF MANCHESTER, HENRY ASHLEY COX, OF EALING, AND ALFRED WARWICK GATTIE, OF LONDON, ENGLAND.

MEANS FOR DISTRIBUTING PARCELS AND THE LIKE.

1,223,624.

Specification of Letters Patent.

Patented Apr. 24, 1917.

Application filed December 7, 1911. Serial No. 664,468.

*To all whom it may concern:*

Be it known that we, ARTHUR GEORGE SEAMAN, a subject of the King of Great Britain, residing in Bowden, England, SAMUEL OSBORNE, a subject of the King of Great Britain, residing in Manchester, England, HENRY ASHLEY COX, a subject of the King of Great Britain, residing in Ealing, England, and ALFRED WARWICK GATTIE, a subject of the King of Great Britain, residing in London, England, have invented certain new and useful Improvements in and Relating to Means for Distributing Parcels and the like, of which the following is a specification.

This invention relates to apparatus for effecting the automatic transfer of parcels and the like between two moving vehicles or "truckers" or a moving vehicle and a bay or station, or a station and a trucker. In the apparatus referred to the parcels are placed upon iron trays, which trays are transferred from trucker to trucker, trucker to station, or station to trucker, by means of driven rollers, which engage the said trays, of which rollers those upon one trucker act to discharge the tray, while the others upon the second trucker, or at the station as the case may be, act, to receive the tray and bring it to rest, or conversely the station rollers discharge it and the trucker rollers receive it.

The present invention has for its primary object to provide apparatus of the general type above specified, in which the motion for the rollers acting upon the trays is derived from the interaction of coöperating members, carried by the truckers or carried by the trucker, and located at the stations.

In practice, each pair of members may comprise an arm fixed to a shaft, with which is associated suitable mechanism, to be hereafter described, and which mechanism operates the rollers, and which shaft is mounted upon one vehicle, or at a station, and a cam path or track upon a second vehicle, or at a station, as the case may be. The arms are acted upon by the cam or track engaging rollers upon said arms, and the shaft is caused to move at a predetermined velocity and acceleration. Each trucker is provided both with arms, such as above specified, for the operation of its own transfer mechanism, and with a cam path or track for the operation of the transfer gear of the second trucker or the station to which the trays are to be delivered.

As the apparatus at the station is identical with that upon trucker, for simplicity of illustration and description only a trucker provided with the apparatus is illustrated and described.

In the accompanying drawings:—

Figure 1. is a side elevation partly in section of a carriage constructed in accordance with our invention.

Fig. 2. is a plan.

Figs. 1ª. and 2ª. are views similar to views 1 and 2 respectively but show the other end portion of the carriage.

Fig. 4. is a similar section on line B B, Fig. 2.

Fig. 5. is a sectional plan on line C C, Fig. 3.

Referring to the accompanying drawings, 1 indicates generally the frame of the carriage which may be of any convenient form and construction, and which in the present instance comprises angle iron members 2 bent as shown, and which members form the sides of the carriage, and which side members are connected by means of cross stays such as 3. The frame 1 is provided with a plate 4 supported at its ends by the ends of the side members 2, and also at suitable points of its length by means of the vertical members 5. The frame of the carriage is provided with brackets or bearings 6 which support axles 7 to which are secured wheels 8 designed to support the carriage and to run upon the rails 9. The motive power for the carriage in the present instance comprises an electromotor 10 mounted upon the cross stays 3, and from which motor the power is transmitted by a belt or chain 11 from a pulley 11$^a$ to the countershaft 12 by means of a pulley 13 thereon, and from said countershaft 12 by means of a belt 12$^a$ passing over a second pulley 13$^a$ upon said shaft to a pulley 14$^a$ upon one of the axles 7 of the carriage wheels. The energy of the motor may be conveyed to it in any suitable manner either from conductor rails in a manner sufficiently well known to those skilled in the art to enable further description to be dispensed with.

It may here be explained that there are provided two sets of transfer rollers for each tray. As the mechanism for each is identical in construction and arrangement, that for one set only is described and illustrated in detail in the drawings. The operation of the transfer rollers is primarily effected by means of what, for the purpose of identification, may be described as "roller gear" and which roller gear, as already stated, broadly comprises an arm or other member associated with suitable gearing operating the rollers, whereby, upon the movement of the arm, motion may be imparted to the rollers, the arm being actuated by a cam path or track carried by a second trucker, or arranged at a bay or station, as the case may be. The arms are operated each time the trucker passes a second trucker or a station, but transfer rolls are only operated when a transfer is to take place. The roller gear in the present instance is constructed and arranged as follows:

14, Figs. 1, 2, 3 and 6 indicate a horizontally disposed shaft revolubly mounted in bearings 15 and retained against longitudinal motion by means of a thrust bearing 16. The bearings 15 and 16 are carried by the body 15$^a$ forming an extension of casing 18 supported from the side longitudinal members 19 of frame 1 and to which said casing 18 is connected by means of the extensions or arms 20 which are formed integral with the said casing, see Figs. 1, 2, 3, 5, 6 and 9. Keyed or otherwise secured to the outer end of shaft 14 is the boss 21 provided with arms 22, Figs. 1 and 2, the ends of which arms carry rollers 23, shown in full in Fig. 1 and dotted in Figs. 2 and 9, mounted upon pins 24 on the aforesaid arms 22. The shaft 14 at its inner end has secured to it a bevel wheel 24$^b$ which, as will be hereafter more fully explained, is engaged by wheels such as 24$^a$ freely revoluble on the shaft 25 arranged at a right angle to the shaft 14. Only one of the wheels 24$^a$ is shown, but it will be understood that a similar wheel is provided at the other end of the shaft 25. Slidably mounted by means of a key or the like upon shaft 25 and retained in its mid position by a spring, not shown, is a sleeve 26 provided at each end with teeth 27 designed to engage similar teeth 28 formed upon the bosses of the wheels 24$^a$. The wheels 24$^a$ actuate the delivery mechanism for the tray, and as already explained two sets of mechanism are provided, each being of the same construction and arrangement. Only one half of the length of the sleeve is shown, but the opposite end of the sleeve will be of the same construction and arrangement as that shown.

It will, of course, be understood that both of the arrangements about to be described act together to discharge the tray. By sliding the sleeve to the right or left either of the sets of teeth on the wheels 24$^a$ may be engaged, and the shaft set in motion, the direction of motion of said shaft being governed by the direction in which the sleeve is moved, the rollers acting correspondingly to receive or discharge the tray. The movement of the sleeve 26 is effected by means of the cylinders 28$^a$, in which works a plunger 29 normally retained in a mid position by means of springs 29$^a$, and a spring pressed detent 30 which engages a recess upon a sleeve 31 secured to the plunger 29, and which sleeve is provided with a fork 30$^a$ passing between collars 31$^a$ upon the sleeve 26, see Figs. 3, 4 and 8. The plunger 29 is actuated by means of compressed air, and the admission of the compressed air to either of the cylinders 28$^a$ is controlled by means of magnetically actuated valves of any suitable known construction and indicated in the present instance by 32, see Figs. 2, 3 and 6. The operation of the valves is controlled by means of a device known in the art as a "controller," which, in the present instance, is represented generally by 33, Figs. 1 and 2. The "controller" forms no part of the present invention, but in order to facilitate the understanding of the invention a short general description is here given.

The "controller" comprises a rotating body provided with means designed at a predetermined point in the rotation of the said body to close an electric circuit whereupon the particular mechanism included in said circuit is set in motion. A step by step movement is imparted to the said body by means of a ratchet and pawl actuated by an electromagnet, current impulses being given to the magnet so that the rotary body may be primarily advanced through such an angle represented by a predetermined number of teeth of the ratchet wheel so that as the vehicle travels on its course and passes other vehicles or stations receiving as it approaches each of said vehicles or stations a single impulse, the impulse so given will rotate the body until the circuit closing means is brought into operation, and the energization of the magnet of the valves is effected, and the compressed air admitted to the cylinders 28ª.

Figure 1A:
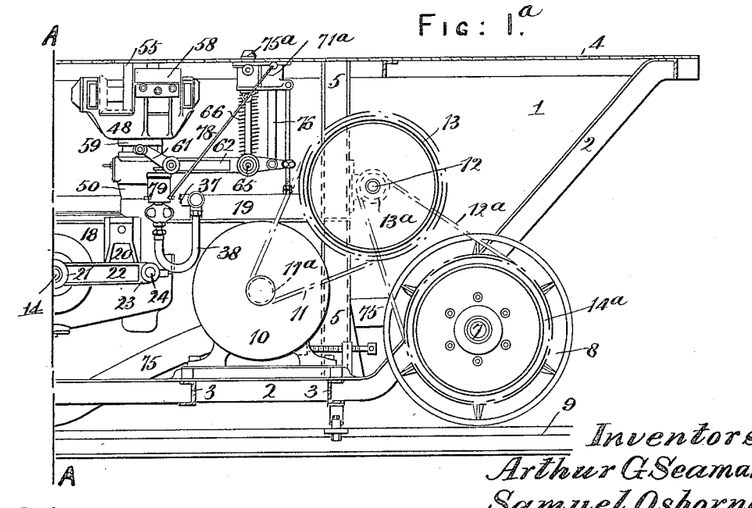
Figure 2A:
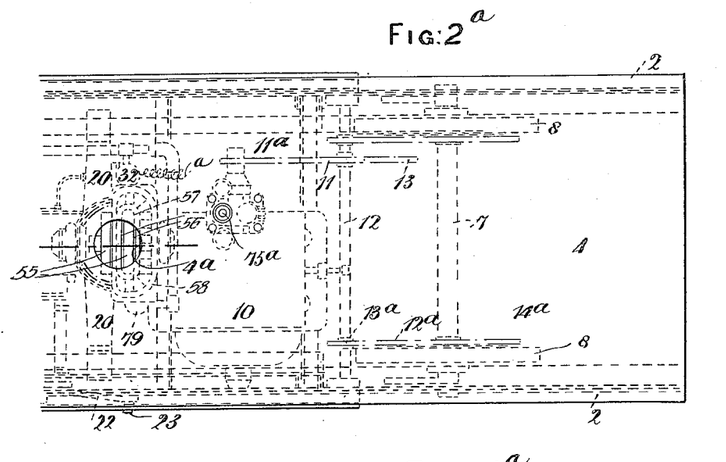
Figures 7, 10:
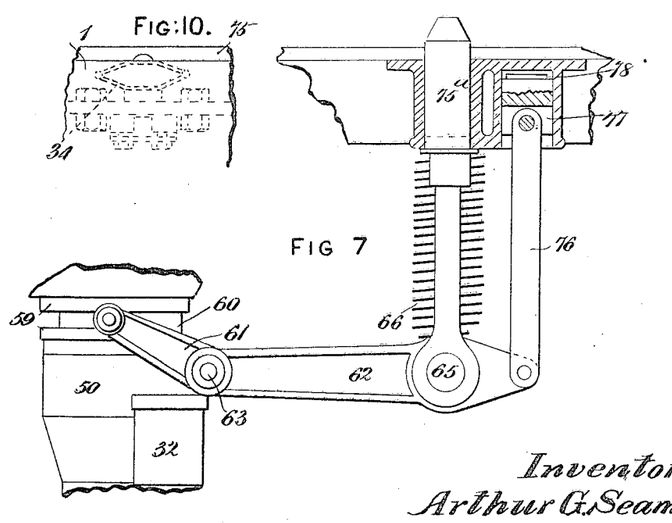
Fig. 7. is a sectional elevation to an enlarged scale of means for securing the trays against accidental displacement.
Fig. 10 shows to a larger scale a plan of one of the shoes or collectors for the electric current to the controller.

The current for the controller is taken by means of brushes or contacts 34, see Figs. 1, 2 and 10, and which brushes are carried by the carriage and are designed when passing a bay or other body to come into contact with conductor rails or strips whereby the current may pass through the controller to operate same and secure the desired operation of the magnetically operated air valves 32 at the desired moments. The magnets of the air valves are connected with the controller by means of conductors $a$ $a^1$ attached to terminals on the casings of the valves. The air for operating the parts is contained in receptacles 35, 36, one of which is filled with air at a lower pressure than the other, and from which receptacle 36 the air is taken to the valves 32 by means of pipes or tubes 37 connected to pipes 38, see Figs. 1 and 2.

Secured to the shaft 25 is a pinion 25ª, which pinion is in gear with a pinion 39, revoluble with and mounted to slide upon a vertical shaft 40, mounted in a suitable bearing 41 at the lower end, and in which bearing the boss of the wheel 39 rotates. The shaft 40 is carried by a sleeve 49, hereafter referred to, and is supported at its lower end by the wheel 39, as just explained, other bearings being provided at 42 and 43, a thrust bearing being provided at 44. The shaft sleeve 43 is capable of vertical movement so that shaft 40 has a certain amount of movement independently of the pinion 39, and at its upper end it is provided with a bevel wheel 45 which is dished as shown. Arranged transversely to the line of shaft 40 is a spindle 46 for which bearings 47 are provided in the fork or head 48 forming part of the extension or sleeve 49 above referred to, and which sleeve is revolubly mounted within a tubular extension 50 forming part of the aforesaid casing 18. The spindle 46 aforesaid is provided with a pinion 51 in gear with wheel 45, a thrust bearing 52 being provided for the said spindle as shown in Fig. 4. In order that the shaft 40 may be secured against accidental rotation, when it is in its neutral position, the end of said shaft is provided with a projection 53 designed to engage a recess formed in a body 54 as shown in Fig. 4. The spindle 46 has secured to it a roller 55 recessed as shown at 56 to form two disks, one of which passes through the opening 57 in a solenoid 58 supported upon flanges 59 provided for this purpose upon the head 48. The roller 55 is arranged beneath an opening 4ª in the plate 4, and in order that the said roller may be raised when it is desired to remove the tray, indicated in dotted lines by $T^1$ in Fig. 9, the extension 49 for which a bearing is provided at 49ª is provided at its upper end with collars 59 between which enters a fork 60, as shown in dotted lines in Fig. 6, to which are connected the ends of levers 61, 62, Fig. 1, secured to a pin 63 for which a bearing 64 is provided upon the member 50 of casing 18 in Figs. 1, 4 and 7. The lever 62 near its outer end is provided with a pin 65 to each end of which is secured one end of a spring 66, the said springs being connected at their upper ends to the under side of the plate 4. The fork 48 is also required to swivel during the transfer or receipt of the tray in order that the rollers 55 may act in the desired direction to remove or receive the said tray and in order that the said turning movement may be effected, the extension 49 is provided with a toothed ring 67 with which engages a rack 68 secured to a rod 69 by a clamp 70. The rod 69 is substantially a double ended piston, for each end of which a cylinder 71 is provided, and each of which cylinders may be supplied with compressed air at will, which, acting upon the piston, serves to move it in one or other direction, turning the extension 49. The arrangement of the rod and cylinder may be clearly seen from Fig. 5, the air being admitted to the cylinders by pipes 72, the air admission thereto being controlled by the valves 79 or similar valves provided for this purpose. In order that the extent of the vertical movement of the extension 49 may be limited, the said extension has secured to it a ring 73 slotted to engage the end of a stud 74, and at each end provided with vertical slits 74ᵇ shown dotted in Fig. 3 to permit the vertical movement of the extension 49, the extent of said slot 74ª regulating the turning movement of the said extension. In order that the trays may be retained, and their accidental movement prevented, plungers 75ª are provided which are connected at their lower ends to the levers 62, and which plungers 75ª are designed to engage suitable recesses formed in the trays for the goods. The levers at their outer ends are connected to rods 76 which at their upper ends are attached to pistons 77 moving in cylinders 78 Fig. 7, to which compressed air is admitted from the cylinder 71 in which are provided ports adapted to be uncovered by the rod 69 in its movement to the right or left, so that air is permitted to pass by tubes such as 71ª Fig. 1. The tubes 71ª are indicated by dotted lines in Fig. 5, and the tubes from each cylinder 71 are joined together as shown so that the uncovering of either port in the cylinders 71 will cause the plunger 75ª to be drawn out of engagement with the tray. The levers 61, 62 are fulcrumed on the pin 63, and consequently the movement of the levers to raise the extension 49 will cause the plunger 75ª to be drawn down so that the tray is free to be removed by the time the roller 55 is in contact with the tray. The rollers are normally held clear of the tray by means of the aforesaid springs 66.

Figures 3, 8, 9:
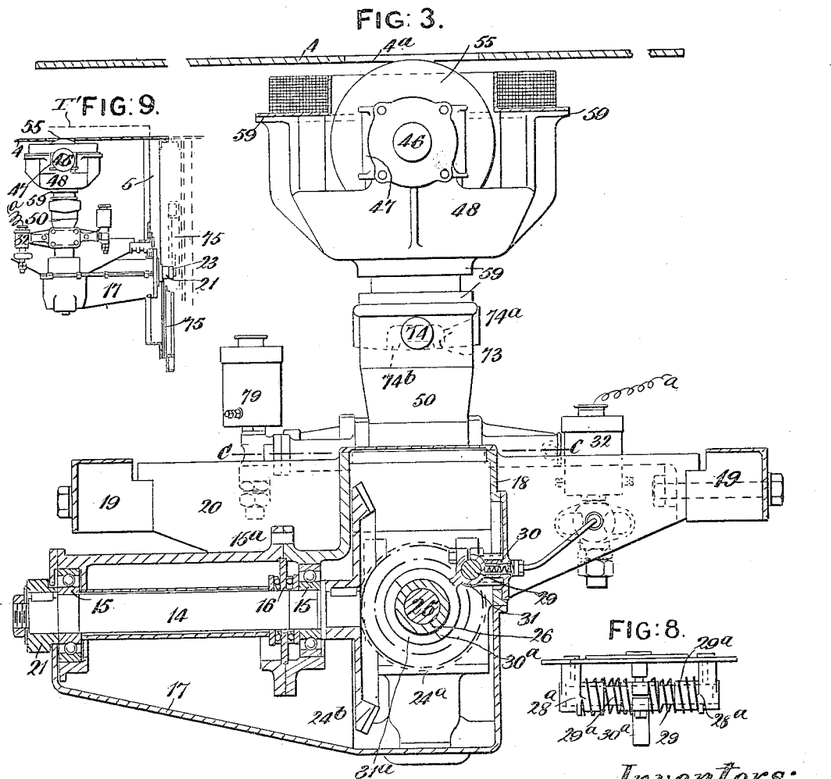
Fig. 3. is a vertical section on line A A, Fig. 1ª.
Fig. 8. is a side elevation of part of the mechanism for effecting the movement of the driving mechanism for the rollers for effecting the discharge of the trays.
Fig. 9. is a fragmentary end view of the carriage.
Figure 6:
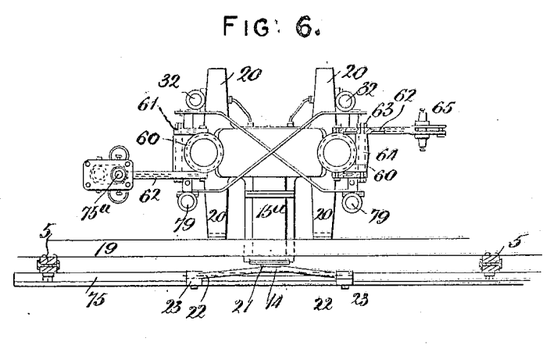
Fig. 6. is a plan of certain of the operative parts together with the means for controlling same.

The track, cam, or surface before referred to as effecting the operation of the roller 55, and which track is shown at 75, Figs. 1, 2 and 9, is formed of channel iron supported at each end upon the uprights 5 of the frame. As will be seen on reference to the drawings, there are two tracks or the like 75, one arranged upon each side of the trucker, and each designed to engage the rollers of the arms 22 of the apparatus of a second trucker or station as the case may be. In the present instance such tracks are shown as disposed below the level of the rollers 23 on arms 22. It will be understood that the operating track for the rollers 23 would be arranged at such a level upon another trucker or a bay, that the mouth or end of the track would be in a position to engage the roller 23, see Fig. 9, and according to the direction of motion of the trucker relative to another trucker, or the direction of said trucker in relation to a bay, the roller upon the right or left hand arm 24 would be engaged and constrained to follow the path of the track so long as it was in engagement therewith. The operation of one arm causes the direction of motion of the shaft 14 to be in the opposite direction to its motion when the other arm 22 is actuated. The outline of the track 75 would be such that the arm is caused to turn through 90°, and the movement of the arm accelerated up to the moment when the transfer of the tray is being made. After the moment of transfer the arm is caused to turn through an angle of 90°, the track being so shaped that the velocity of the arm is retarded and the arm brought suitably to rest, so that the tray starts to move and comes to rest without jar or shock. Although the arms 22 of both sets of apparatus on the two truckers, or upon the trucker and station, are operated each time one trucker passes another, or passes a bay, the movement of the said arm will not be effective to operate the rollers 55 until and unless the working fluid be admitted to the cylinders operating the sleeve, 26, and the other devices for effecting the rotation of the roller carrying heads 48 and for lifting the rollers to bring them into contact with the tray. All the devices for effecting the operation just referred to are under the control of the controller, of the action of which a general outline has already been given, so that unless the circuit for the various magnetic valves is closed by the controller, the arms are simply turned through an angle of 180°, and no transfer of the tray takes place. As will be seen on reference to the drawings, the track 75 is of the same contour upon both sides of its center so that the arm 22 is returned to its starting point, and, after a transfer, it is left in a position ready for reëngagement by the track upon the next trucker or bay that may be passed. Should, however, the circuit be closed by the controller just before passing a carriage or bay, the sleeve will be shifted so that the teeth 27 at each end of said sleeve will engage the teeth on one or other of the pinions 24ª whereby the shaft 25 will be rotated, the direction of rotation depending upon the direction of motion of the truckers, if the transfer is to be made between two truckers, or the direction from which the trucker approaches the station, as the case may be. Motion is transmitted from pinion 25ª upon said shaft to pinion 39 on shaft 40. The rotation of shaft 40 will then be transmitted to pinion 45 and by said pinion to spindle 46 upon which the roller 55 is mounted. Simultaneously with the aforesaid operation the extensions 49 carrying heads 48 and spindles 46 will be raised and the plungers 75ª will be drawn down out of engagement with the recesses in the tray so that the said tray is free to move under the action of the rollers 55. Previous to the operations just described, the extensions 49 are caused to rotate by the movement of rods 69 carrying the racks 68 which engage the toothed ring 70 on each of said extensions 49, the direction of motion of the heads 48 being toward or away from the approaching trucker or bay as the case may be, depending upon whether a tray is to be received by or rejected from the moving carriage.

During the above operations, which are performed by the apparatus upon the trucker or station despatching the tray, a similar series of operations are taking place upon the trucker or station receiving the tray, and by the time the tray passes thereto, the rollers thereon are moving at their maximum acceleration, gradually coming to rest as the tray leaves the first trucker or station as the case may be, in the manner already explained.

Claims:

1. Automatic goods distributing apparatus comprising two bodies moving in relation to one another for transporting the goods, means on one body for transferring said goods, means upon a second body for receiving said goods, means upon said second body for operating the transfer mechanism, and means upon the first body for operating the receiving mechanism of the second body.

2. Automatic goods distributing apparatus comprising two relatively moving bodies, means for propelling one of said bodies, means upon said body for effecting the transfer of trays containing the goods to the second body, means upon said second body for receiving said trays, a movable member operatively associated with said transfer mechanism, a track upon the second body for engaging and operating said movable member, a movable member operatively associated with said receiving mechanism, and a track upon the first body for engaging and operating said movable member of the receiving mechanism.

3. Automatic goods distributing apparatus comprising two relatively moving bodies, means for propelling one of said bodies, means upon said body for effecting the transfer of trays containing the goods to the second body, means upon said second body for receiving said trays, an arm moving in a circular path operatively associated with said transfer mechanism, a track upon the second body for engaging and operating said arm, an arm movable in a circular path operatively associated with said receiving mechanism, and a track upon the first body for engaging and operating said arm of the receiving mechanism.

4. Automatic goods distributing apparatus comprising two relatively moving bodies for transporting the goods, rollers for effecting the transfer of trays containing said goods upon one body, rollers upon one of said bodies to receive said trays, an arm movable in a circular path operatively associated with said transfer rollers, a track upon the second body engaging and operating said arm, an arm movable in a circular path operatively associated with said receiving rollers, and a track upon the first body engaging and operating said arm of the receiving mechanism.

5. Automatic goods distributing apparatus comprising two relatively moving bodies for transporting the goods, rollers for effecting the transfer of trays containing said goods upon one body, rollers upon the second body to receive said trays, an arm movable in a circular path operatively associated with said transfer rollers, a track upon the second body whereby said arm of the transferring rollers is constrained to follow a predetermined path at a predetermined acceleration and retardation of angular movement, an arm movable in a circular path operatively associated with said receiving rollers, and a track upon the first body whereby said arm of the receiving rollers is constrained to follow a predetermined path at a predetermined acceleration and retardation of angular movement.

6. Automatic goods distributing apparatus comprising two relatively movable bodies adapted to run upon tracks; an electric motor for propelling said bodies; rollers for effecting the transfer of trays containing the goods; revoluble heads carrying said rollers; vertical spindles capable of longitudinal motion and carrying said heads; means for effecting the longitudinal motion of the spindles; means for effecting the rotation of the revoluble heads; roller rotating means; an arm carrying rollers operatively associated with said roller rotating means; and a track supported upon the body to which the trays are to be transferred for engaging the rollers upon the arm.

7. Automatic goods distributing apparatus comprising a carriage adapted to run upon a track, rollers having spindles for effecting the transfer of the trays containing the goods, two vertically disposed reciprocating revolubly mounted spindles, frames on the carriage supporting the roller spindles and vertically disposed spindles, said frames being capable of longitudinal and rotary motion, means for effecting the longitudinal and rotary motion of the frames, pinions on each of the roller spindles, pinions on the upper ends of the aforesaid vertical spindles in mesh with the pinions on the roller spindles, a pinion on the lower end of each vertical spindle, a horizontal spindle arranged at a right angle to the vertically disposed spindles and provided at each end with pinions, each of which is in engagement with one of the lower pinions on the vertical spindles, a pair of pinions freely mounted on the horizontal spindle, a second horizontal spindle arranged at a right angle to the first, and carrying an arm, a track supported independently of the carriage upon which the arm is mounted designed to engage said arm and whereby it is constrained to follow a predetermined path at a predetermined acceleration and retardation of angular velocity, a pinion upon said second horizontal spindle engaging both of the free pinions on the first horizontal spindle, clutch teeth upon said free pinions, and a body sliding upon the first horizontal spindle and operable to engage either of the free pinions whereby the transfer rollers may be caused to rotate in either direction and means for effecting the longitudinal movement of the sliding body.

8. Automatic goods distributing apparatus comprising a carriage adapted to run upon a track, rollers having spindles for effecting the transfer of the trays containing the goods, two vertically disposed reciprocating revolubly mounted spindles, frames on the carriage supporting the roller spindles and vertically disposed spindles, said frames being capable of longitudinal and rotary motion, means for effecting the longitudinal and rotary motion of the frames, pinions on each of the roller spindles, pinions on the upper ends of the aforesaid vertical spindles in mesh with the pinions on the roller spindles, a pinion on the lower end of each vertical spindle, a horizontal spindle arranged at a right angle to the vertically disposed spindles and provided at each end with pinions, each of which is in engagement with one of the lower pinions on the vertical spindles, a pair of pinions freely mounted on the said horizontal spindle, a second horizontal spindle arranged at a right angle to the first, and carrying an arm, a track supported independently of the carriage upon which the arm is mounted designed to engage said arm whereby it is constrained to follow a predetermined path at a predetermined acceleration and retardation of angular velocity, a pinion upon said second horizontal spindle engaging both of the free pinions on the first horizontal spindle, clutch teeth upon said free pinions, and a body sliding upon the first horizontal spindle and operable to engage either of the free pinions whereby the transfer rollers may be caused to rotate in either direction, and means for effecting the longitudinal movement of the sliding body, comprising a fluid actuated plunger having a forked member engaging projections on the sliding body, electrically actuated valves controlled independently of the transfer mechanism regulating the admission of the operating fluid.

9. Automatic goods distributing apparatus comprising a carriage adapted to run upon a track, rollers having spindles for effecting the transfer of the trays containing the goods, two vertically disposed reciprocating revolubly mounted spindles, frames on the carriage supporting the roller spindles and vertically disposed spindles, said frames being capable of longitudinal and rotary motion, a system of levers connected with the vertically moving frames, a rack upon the exterior of the frame, means for effecting the longitudinal and rotary motion of the frames comprising fluid actuated plungers which in one case operate said system of levers, and in the other are provided with teeth engaging said rack, pinions on each of the roller spindles, pinions at the upper end of each of the aforesaid vertical spindles, a pinion on the lower ends of each vertical spindle in mesh with the pinions on the roller spindles, a horizontal spindle arranged at a right angle to the vertically disposed spindles and provided at each end with pinions, each of which is in engagement with one of the lower pinions on the vertical spindles, a pair of pinions freely mounted on the said horizontal spindle, a second horizontal spindle arranged at a right angle to the first, and carrying an arm, a track supported independently of the carriage upon which the arm is mounted designed to engage said arm and whereby it is constrained to follow a predetermined path at a predetermined acceleration and retardation of angular velocity, a pinion upon said second horizontal spindle engaging both of the free pinions on the first horizontal spindle, clutch teeth upon said free pinions, and a body sliding upon the first horizontal spindle and operable to engage either of the free pinions whereby the transfer rollers may be caused to rotate in either direction, and means for effecting the longitudinal movement of the sliding body.

10. Automatic goods distributing apparatus comprising a carriage adapted to run upon a track, rollers having spindles for effecting the transfer of the trays containing the goods, two vertically disposed reciprocating revolubly mounted spindles, frames on the carriage supporting the roller spindles and vertically disposed spindles, said frames being capable of longitudinal and rotary motion, means for effecting the longitudinal and rotary motion of the frames, pinions on each of the roller spindles, pinions on the upper ends of the aforesaid vertical spindles in mesh with the pinions on the roller spindles, a pinion on the lower end of each vertical spindle, a horizontal spindle arranged at a right angle to the vertically disposed spindles and provided at each end with pinions, each of which is in engagement with one of the lower pinions on the vertical spindles, a pair of pinions freely mounted on the said horizontal spindle, a second horizontal spindle arranged at a right angle to the first, and carrying an arm, a track supported independently of the carriage upon which the arm is mounted designed to engage said arm and whereby it is constrained to follow a predetermined path at a predetermined acceleration and retardation of angular velocity, a pinion upon said second horizontal spindle engaging both of the free pinions on the first horizontal spindle, clutch teeth upon said free pinions, and a body sliding upon the first horizontal spindle and operable to engage either of the free pinions whereby the transfer rollers may be caused to rotate in either direction, and means for effecting the longitudinal movement of the sliding body, comprising projections on the sliding body, a fluid actuated plunger having a forked member engaging said projections, electrically actuated valves for controlling the admission of the fluid to the plunger cylinders, said valves being controlled by means independent of the means controlling the transfer mechanism.

11. Automatic goods distributing apparatus comprising a carriage adapted to run upon a track, rollers having spindles for effecting the transfer of the trays containing the goods, said rollers being magnetized to secure cohesion between the said rollers and the trays, two vertically disposed reciprocating revolubly mounted spindles, frames on the carriage supporting the roller spindles and vertically disposed spindles, said frames being capable of longitudinal and rotary motion, means for effecting the longitudinal and rotary motion of the frames, pinions on each of the roller spindles, pinions on the upper ends of the spindles, a pair of pinions freely mounted on said horizontal spindle, a horizontal spindle arranged at a right angle to the vertically disposed spindles and provided at each end with pinions, each of which is in engagement with one of the lower pinions on the vertical spindles, a pair of pinions freely mounted on said horizontal spindle, a second horizontal spindle arranged at a right angle to the first, and carrying an arm, a track supported independently of the carriage upon which the arm is mounted designed to engage said arm and whereby it is constrained to follow a predetermined path at a predetermined acceleration and retardation of angular velocity, a pinion upon said second horizontal spindle engaging both of the free pinions on the first horizontal spindle, clutch teeth upon said free pinions, and a body sliding upon the first horizontal spindle and operable to engage either of the free pinions whereby the transfer rollers may be caused to rotate in either direction and means for effecting the longitudinal movement of the sliding body.

12. Automatic goods distributing apparatus comprising a carriage adapted to run upon a track, rollers having spindles for effecting the transfer of the trays containing the goods, said rollers being magnetized to secure cohesion between the said rollers and the trays, the magnetization of the roller being effected by windings partially surrounding said rollers, two vertically disposed reciprocating revolubly mounted spindles, frames on the carriage supporting the roller spindles and vertically disposed spindles, said frames being capable of longitudinal and rotary motion, means for effecting the longitudinal and rotary motion of the frames, pinions on each of the roller spindles, pinions on the upper ends of the aforesaid spindles in mesh with the pinions on the roller spindles, a pinion on the lower end of each vertical spindle, a horizontal spindle arranged at a right angle to the vertically disposed spindles and provided at each end with pinions each of which is in engagement with one of the lower pinions on the vertical spindles, a pair of pinions freely mounted on said horizontal spindle, a second horizontal spindle arranged at a right angle to the first, and carrying an arm, a track supported independently of the carriage upon which the arm is mounted designed to engage said arm and whereby it is constrained to follow a predetermined path at a predetermined acceleration and retardation of angular velocity, a second horizontal pinion upon said spindle engaging both of the free pinions on the first horizontal spindle, clutch teeth on said free pinions, and a body sliding upon the said first horizontal spindle and operable to engage either of the free pinions whereby the transfer rollers may be caused to rotate in either direction, and means for effecting the longitudinal movement of the sliding body.

In witness whereof we have hereunto affixed our signatures in the presence of the undersigned witnesses.

ARTHUR GEORGE SEAMAN.
SAMUEL OSBORNE.
HENRY ASHLEY COX.
ALFRED WARWICK GATTIE.

Witnesses to the signatures of Arthur George Seaman and Samuel Osborne:
ERNOLD SIMPSON MOSELEY,
MALCOLM SMETHURST.

Witnesses to the signatures of Henry Ashley Cox and Alfred Warwick Gattie:
R. WESTACOTT,
O. J. WORTH.